United States Patent [19]

Belser et al.

[11] Patent Number: 5,493,815
[45] Date of Patent: Feb. 27, 1996

[54] CORROSION BARRIER FOR AUTOMOTIVE WEATHERSTRIPS

[75] Inventors: John W. Belser; Henry E. Sears, both of Northville, Mich.

[73] Assignee: The Standard Products Company, Cleveland, Ohio

[21] Appl. No.: 61,435

[22] Filed: May 17, 1993

[51] Int. Cl.⁶ .................................................. E06B 7/16
[52] U.S. Cl. ................................................ 49/490.1; 49/377
[58] Field of Search .................... 49/377, 462, 490.1; 52/716.5, 716.8, 717.01

[56] References Cited

U.S. PATENT DOCUMENTS

| | | |
|---|---|---|
| 4,139,234 | 2/1979 | Morgan . |
| 4,259,812 | 4/1981 | Adell ............................................ 49/462 |
| 4,572,872 | 2/1986 | Yamazaki et al. . |
| 4,682,442 | 7/1987 | Adell . |
| 4,709,525 | 12/1987 | Adell . |
| 4,783,931 | 11/1988 | Kirkwood . |
| 4,949,507 | 8/1990 | Vaughan . |
| 4,969,303 | 11/1990 | Emmons .............................. 49/462 X |
| 5,028,460 | 7/1991 | Kimura et al. ...................... 52/716.5 X |
| 5,085,024 | 2/1992 | Emmons et al. ...................... 49/462 X |
| 5,207,027 | 5/1993 | Larsen ................................. 49/377 X |

*Primary Examiner*—Philip C. Kannan
*Attorney, Agent, or Firm*—Harness, Dickey & Pierce

[57] ABSTRACT

An automotive beltline weatherstrip engaging an end flange of a vehicle for operative sealing between a glass window and a vehicle surface. The beltline weatherstrip having a core metallic layer and a dissimilar outer appearance metallic layer, separated by a film barrier layer, thereby preventing galvanic corrosion. A further aspect of the present invention relates to processes by which the weatherstrip with two dissimilar materials, separated by a barrier layer, can be manufactured.

7 Claims, 2 Drawing Sheets

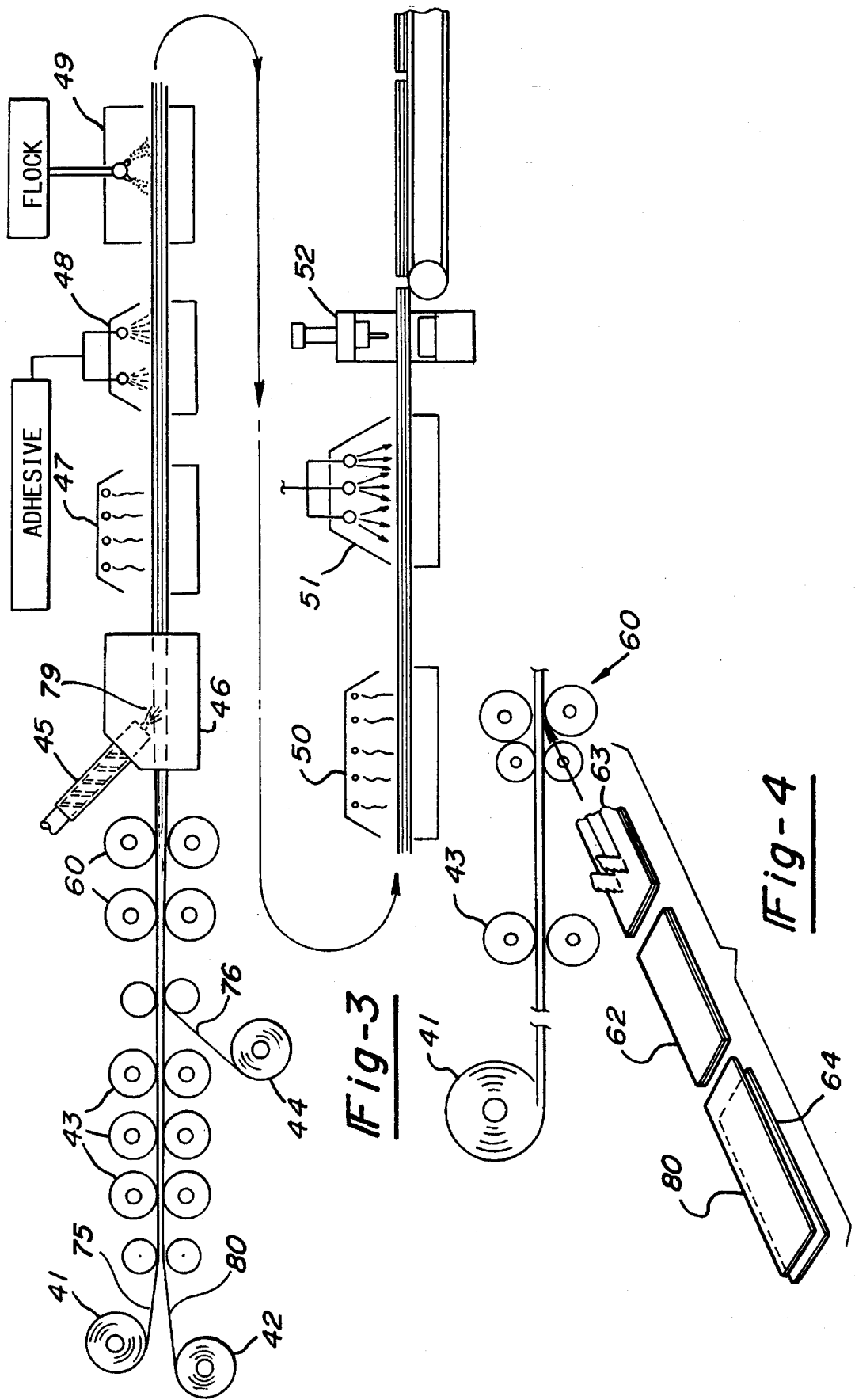

CORROSION BARRIER FOR AUTOMOTIVE WEATHERSTRIPS

BACKGROUND OF THE INVENTION

This invention relates generally to weatherstrips for automotive vehicles and specifically to weatherstrips having a core metallic layer and a dissimilar outer appearance metallic layer, separated by a barrier layer.

The worldwide automotive market has become increasing competitive and consumers have become more quality conscious. In particular, Galvanic corrosion has become a significant problem for automotive weatherstrips, and specifically beltline weatherstrips. Within a beltline weatherstrip an aluminum core material is often in contact with an outer aesthetic cap made of stainless steel. Galvanic corrosion can occur since these two metals have a different solution potential wherein the stainless steel acts as a cathode and the aluminum acts as an anode. The electrically conductive solution comes from salt water caused by acid rain, road salt spray and ocean salt spray that seeps between the two metals. This type of galvanic corrosion causes staining, bleeding and often bubbling of rust beneath the synthetic rubber or cap material.

Galvanic corrosion has become more intensified due to the use of EPDM synthetic rubber, rather than the prior SBR type of synthetic rubber previously used. Currently, one method which circumvents the corrosion problem is to use similar materials for the core and for the cap members. However, this usually necessitates that stainless steel be used for both members, thus, the beltline weatherstrip becomes very expensive.

Fender or quarter panel bright strips such as those shown by reference in U.S. Pat. No. 4,709,525, entitled "Molding For Automobile Body Panels, Such As Doors", issued on Dec. 1, 1987 to Adell, and U.S. Pat. No. 4,682,442, entitled "Door Edge Guard And Method", issued on Jul. 28, 1987 to Adell, have used an insulating layer between an inner section of the metal bright strip and the steel body panel. However, these products have not suggested the use of a barrier layer between two inner dissimilar metal parts. Furthermore, these bright strips were not encapsulated within a highly conductive EPDM elastomer. Moreover, the insulating layer used for these parts consists of a polyvinyl chloride (PVC) plastic layer which cannot withstand the high vulcanizing temperatures required for weatherstrips.

SUMMARY OF THE INVENTION

In accordance with the present invention, a weatherstrip, containing two dissimilar metals, is electrically isolated by a barrier layer, thereby preventing galvanic corrosion. By isolating the cap material from the core material the galvanic reaction is reduced. The term "weatherstrip" includes beltline weatherstrips, door top moldings, back window moldings and the like. A further aspect of the present invention relates to a process by which a weatherstrip, with two dissimilar materials, separated by a barrier layer, can be manufactured. This innovative process allows a barrier film to be fed into a set of roll form dies with the core material. The barrier film may be adhesively bonded to, or separate from, the core material. This method allows for a low cost barrier material to be used in the conventional weatherstrip tools and equipment.

In an alternate embodiment of the present invention, a process to manufacture the weatherstrip comprises a system wherein the barrier film is fed into the roll form dies separately or adhesively bonded to the cap material. This method allows for better alignment of the barrier film to the cap material and for off line bonding of the barrier film to the cap material. Thus, the present invention has many advantages over the prior art and reduces the current galvanic corrosion process.

BRIEF DESCRIPTION OF THE DRAWINGS

FIG. 3 depicts the processing steps for the embodiment of the present invention beltline weatherstrip, shown in FIG. 2, wherein the barrier film material is fed into the roll form dies with the core material; and FIG. 4 depicts the processing steps for the embodiment of the present invention beltline weatherstrip, shown in FIG. 2, wherein the barrier film material is fed into the roll form dies with the cap material.

DESCRIPTION OF THE PREFERRED EMBODIMENT

Figure 1:
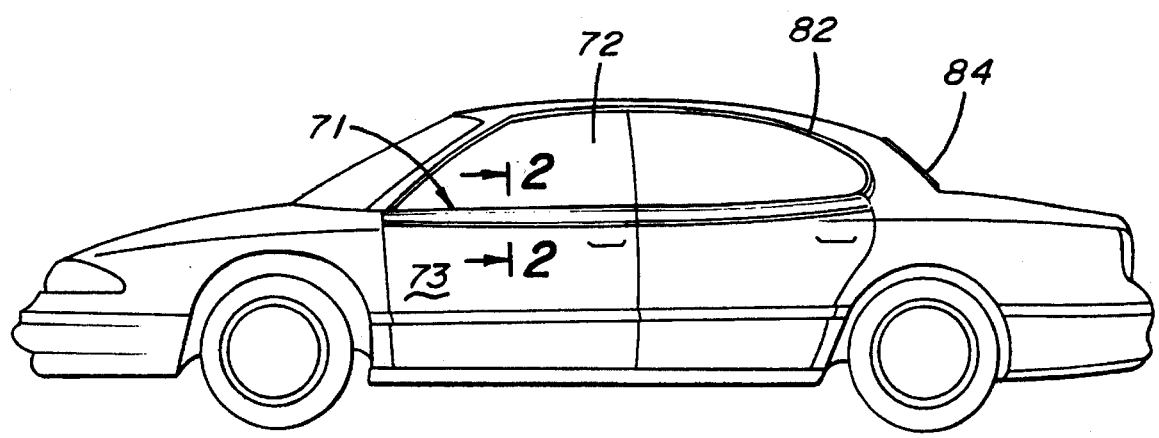
FIG. 1 is a side view of an automobile showing the relative location of the present invention beltline weatherstrip.
Figure 2:
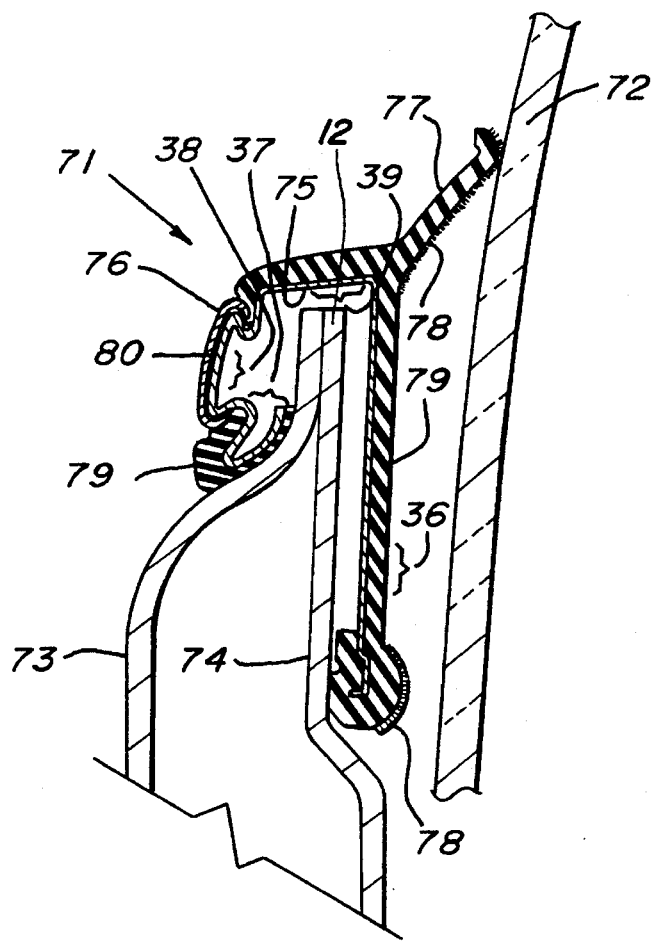
FIG. 2 is a sectional view of the embodiment of the present invention beltline weatherstrip in relation to the door panels and side window glass, taken from FIG. 1.

Referring to FIG. 1, the beltline weatherstrip 71 of the present invention is shown at a substantially horizontal position where the movable side window glass 72 meets the door outer sheet metal panel 73; this area is known as the beltline of the vehicle. The beltline weatherstrip 71 primarily performs two functions. First, it serves as a water, ice and wind seal against the side window glass 72. Second, the beltline weatherstrip 71 serves as an aesthetic part by hiding the raw end flanges 12 of the door outer sheet metal panel 73 and the door inner sheet metal panel 74. This can best be seen in FIG. 2. The outer sheet metal panel 73 is configured as part of the outer body shape of the vehicle and includes an outer show surface which is the finished exterior of the vehicle. The inner sheet metal panel 74 faces inward toward the side window glass panel 72. The beltline weatherstrip of the present invention consists of a core which is partially encapsulated within an elastomer, an appearance cap, both of which are separated by a film barrier layer.

An elongated metallic core 75 acts as a structural support for the beltline weatherstrip 71 and the core material 75 is preferably made from a malleable aluminum material. The elongated core 75 includes a flange portion 36, a show surface attachment portion 38 and an intermediate portion 39. The flange portion 36 is configured for placement adjacent to the inner surface of the door sheet metal end flanges 12 and the intermediate portion 39 connects the show surface portion 38 with the flange portion 36. The core member 75 also contains an S-shaped compression attachment portion 37 which acts coextensively with the flange portion 36 so as to retain the beltline weatherstrip 71 onto the door metal end flanges 12.

An elastomeric synthetic rubber material 79 partially encapsulates the core material 75. A synthetic rubber finger 77 is also integrated into the beltline weatherstrip 71 thereby providing an effective weather seal against the side window glass 72. The synthetic rubber material preferably used is an ethylene-propylenediene terpolymer (EPDM) elastomer although a styrene-butadiene (SBR) material may be used. The back side of the rubber finger 77 and various hidden portions of the rubber 79 may contain adhesively bonded fibers, known as flocking 78, which allow the side window glass 72 to move freely over the rubber surfaces.

In many cases the core member 75 has an appearance cap 76 crimped onto it. This cap member 76 is made from stainless steel type 51434 and primarily serves an aesthetic function. A barrier film 80 is mounted between the core member 75 and the stainless steel cap 76. This barrier film 80 serves to prevent the stainless steel cap member 76 from contacting the aluminum core 75, thereby preventing galvanic corrosion. Although an adhesive layer may be required for the barrier film 80 to be retained in this location, the forming of the C-shaped stainless steel cap 76 upon the aluminum core 75 should be sufficient to retain the barrier film 80 in its proper location. The barrier film 80 is preferably a 0.002 inch thick strip of polyester film which may contain a pressure sensitive adhesive backing.

FIG. 3 depicts the preferred steps required to process the beltline weatherstrip 71. The barrier film 80 is held in close registry with the aluminum core 75 as they are distributed from their respective roll, 42 and 41, and are then fed through a first set of roll form dies 43. The barrier film 80 may need to be adhesively bonded to the aluminum core 75 by using a pressure sensitive adhesive. The roll form dies 43 form the aluminum core to the desired cross sectional shape. As is traditionally done, the stainless steel cap 76 is then distributed from a roll 44 and is fed into a second set of roll form dies 60 coextensively with the preformed aluminum core 75 and film 80. At this point, the roll form dies 60 crimp the cap 76 onto the aluminum core 75, whereas the barrier film 80 is trapped therebetween.

An EPDM elastomer 79 is then extruded onto the aluminum core 75, barrier 80 and cap 76, in a cross headed die 46. This, and the following steps would be known to one skilled in the art. The assembly is then placed in a curing oven 47 for vulcanization. Next, selective areas of the weatherstrip finger portion 77 and flange portion 36 are adhesively coated at step 48 and thereafter electrostatically flocked 49 with fibers. The adhesive bonded flocking 78 is cured in an oven 50 and is then cleaned and cooled in a washing station 51. At the next stage, the beltline weatherstrip 71 is cut to size at station 52. The barrier film 80 is comprised of polyester material due to the high vulcanizing temperatures required. These temperatures range between 400° and 500° Fahrenheit. Thus, corrosion insulating materials like PVC used for other applications, such as for exterior bright strips, could not withstand the normal weatherstrip manufacturing temperatures. Furthermore, the polyester film material 80 should be thick enough to withstand the pressures from the roll form dies, 43 and 60, and a thickness of at least 0.002 inches thick has been found suitable.

FIG. 4 shows an alternate process for the present invention. The aluminum core 75 is fed from a roll 41 into a first set of roll form dies 43. These roll form dies 43 create the desired cross sectional shape. Simultaneously, off line, a wide sheet of barrier film 80 is adhesively bonded to a wide sheet of stainless steel cap material 64 thereby forming an assembly 62. This assembly 62 is then sliced to the proper width at step 63 and is then fed into a second set of roll form dies 60 on the main processing line. This series of roll form dies 60 crimp the stainless steel cap 76 bonded with the barrier film 80 onto the preformed aluminum core section 75. At step 45 the EPDM elastomer is then extruded onto the core 75, barrier 80 and cap 76 assembly. Although the barrier material 80 does not cover the longitudinal ends of the stainless steel cap 76 in this alternate process, the barrier film 80 will ooze from under the cap 76 within the vulcanizing ovens 47, such that the aluminum core 75 and the ends of the stainless steel cap 76 are effectively isolated. The remaining processing steps are the same as the preferred embodiment, and are known to one skilled in the art.

It will be appreciated that the beltline weatherstrip of the present invention represents a significant quality improvement such that galvanic corrosion is reduced. Since the film barrier material effectively isolates the cap member from the core member, the galvanic reaction is thereby minimized. Furthermore, the processes by which the barrier material may be inserted between the core and cap layers is very cost effective, accurate and can be manufactured within the current tools.

While a number of specific embodiments of this weatherstrip and the processes to make such have been disclosed, it will be appreciated that various modifications may be made to this weatherstrip without departing from the present invention. For example, the beltline weatherstrip may have different cross sectional shapes such that the aesthetic cap is mounted along the intermediate portion of the core, substantially perpendicular to the door end flanges. While the construction and processes to manufacture a beltline weatherstrip have been described, a similar barrier layer and method to insert the barrier layer between two dissimilar metal members may be applied to other non-beltline synthetic rubber weatherstrips, such as to door top moldings 82, and back window moldings 84, without departing from this invention. Furthermore, while various materials have been disclosed in exemplary fashion, various other materials may of course be employed. For example, SBR, Neoprene, TPE or PVC could be used in place of EPDM. The barrier layer may also be used to separate other metals such as copper from steel or stainless steel from magnesium. It is intended by the following claims to cover these and any other departures from these disclosed embodiments which fall within the true spirit of this invention.

The invention claimed is:

1. A weatherstrip engageable upon a flange of an automotive vehicle for sealing between two vehicle surfaces, said flange having an inner surface and an outer surface, said weatherstrip comprising:

a core member being of a metallic composition and being partially covered by an elastomeric material;

an outer cap member being of a dissimilar metallic composition from said core member, said outer cap member being joined upon an exposed portion of said core member; and a barrier layer located between and electrically isolating said core member and said outer cap member prior to and after installation of said weatherstrip on said automotive vehicle.

2. The weatherstrip of claim 1, wherein said weatherstrip comprises a beltline weatherstrip, having an elastomeric finger thereupon for sealing against a glass window panel.

3. The weatherstrip of claim 2 comprising said barrier layer being a polyester film material.

4. The weatherstrip of claim 3 comprising:

said core member being a malleable aluminum metallic material; and said outer cap member being a stainless steel metallic material.

5. A weatherstrip for an automotive vehicle beltline, said weatherstrip engageable upon a flange of a vehicle door panel for sealing between said vehicle door panel and a glass surface, comprising:

a core member being of a metallic composition, said core member being partially encapsulated within an elastomeric material;

an outer cap member being of a dissimilar metallic composition from said core member, said outer cap member being joined upon an exposed portion of said core member; and a barrier layer located between said core member and said outer cap member during molding of said elastomeric material, said barrier layer having temperature properties suitable for withstanding vulcanizing temperatures employed with said elastomeric material, whereby said outer cap member is isolated from said core member such that galvanic corrosion is reduced.

6. A molding partially surrounding the top of an automotive door comprising:

- a core member being of a metallic composition, said core member being partially encapsulated within an elastomeric material;
- an outer cap member being of a dissimilar metallic composition from said core member, said outer cap member being joined upon an exposed portion of said core member; and
- a barrier layer located between said core member and said outer cap member during molding of said elastomeric material, whereby said outer cap member is isolated from said core member such that galvanic corrosion is reduced.

7. A molding partially surrounding an automotive back window comprising:

- a core member being of a metallic composition, said core member being partially encapsulated within an elastomeric material;
- an outer cap member being of a dissimilar metallic composition from said core member, said outer cap member being joined upon an exposed portion of said core member; and
- a barrier layer located between said core member and said outer cap member during molding of said elastomeric material, whereby said outer cap member is isolated from said core member such that galvanic corrosion is reduced.

* * * * *